United States Patent
Ashizuka et al.

(10) Patent No.: US 11,652,583 B2
(45) Date of Patent: May 16, 2023

(54) ELECTRONIC COMMUNICATION DEVICE, MAGNETIC DISK DEVICE AND SERIAL COMMUNICATION METHOD

(71) Applicants: Kabushiki Kaisha Toshiba, Tokyo (JP); Toshiba Electronic Devices & Storage Corporation, Tokyo (JP)

(72) Inventors: Nobuhiro Ashizuka, Kanagawa (JP); Kenji Yoshida, Kamakura Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 91 days.

(21) Appl. No.: 17/012,218

(22) Filed: Sep. 4, 2020

(65) Prior Publication Data
US 2021/0167902 A1     Jun. 3, 2021

(30) Foreign Application Priority Data
Nov. 29, 2019 (JP) .............................. JP2019-216692

(51) Int. Cl.
H04L 1/00 (2006.01)
H04L 1/20 (2006.01)
H04L 43/04 (2022.01)
G11B 5/012 (2006.01)

(52) U.S. Cl.
CPC ............ H04L 1/203 (2013.01); H04L 1/0056 (2013.01); H04L 43/04 (2013.01); G11B 5/012 (2013.01)

(58) Field of Classification Search
CPC ....... H04L 1/203; H04L 1/0056; H04L 43/04; H04L 43/0823; H04L 41/069; H04L 1/0045; G11B 5/012; G11B 2020/1826; G11B 20/1816
USPC .................................................. 714/723, 773
See application file for complete search history.

(56) References Cited

U.S. PATENT DOCUMENTS

| | | | |
|---|---|---|---|
| 6,556,369 B1* | 4/2003 | Kanamaru | G11B 5/59633 |
| 7,106,742 B1 | 9/2006 | Frisch et al. | |
| 7,506,314 B2* | 3/2009 | Kollmann | G06F 11/3476 714/45 |
| 7,746,771 B1* | 6/2010 | Croak | H04Q 3/0087 370/230.1 |
| 8,867,344 B2 | 10/2014 | Wang et al. | |
| 10,922,484 B1* | 2/2021 | Pereira | G06F 40/279 |
| 2003/0081337 A1* | 5/2003 | Tanimoto | G11B 19/04 360/60 |
| 2003/0198155 A1* | 10/2003 | Go | G11B 7/0045 |
| 2008/0112289 A1* | 5/2008 | Nishimura | G11B 20/18 |

(Continued)

FOREIGN PATENT DOCUMENTS

| | | |
|---|---|---|
| CN | 109815045 A | 5/2019 |
| JP | H1-133440 A | 2/1999 |

*Primary Examiner* — Kyle Vallecillo
*Assistant Examiner* — Osman M Alshack
(74) *Attorney, Agent, or Firm* — Allen & Overy LLP

(57) ABSTRACT

An electronic communication device includes a controller which controls, according to the number of bit data in which an error has occurred of packet data transferred in serial communication, whether to start logging of information about the error of the packet data or stop logging of information about the error of the packet data.

1 Claim, 9 Drawing Sheets

(56) References Cited

U.S. PATENT DOCUMENTS

| | | | |
|---|---|---|---|
| 2012/0051228 A1* | 3/2012 | Shuman | H04W 24/08 |
| | | | 370/242 |
| 2019/0155685 A1* | 5/2019 | Kim | G06F 11/1048 |
| 2020/0026639 A1* | 1/2020 | Mola | G06F 11/3636 |
| 2020/0279584 A1* | 9/2020 | Tomoda | G11B 21/083 |

* cited by examiner

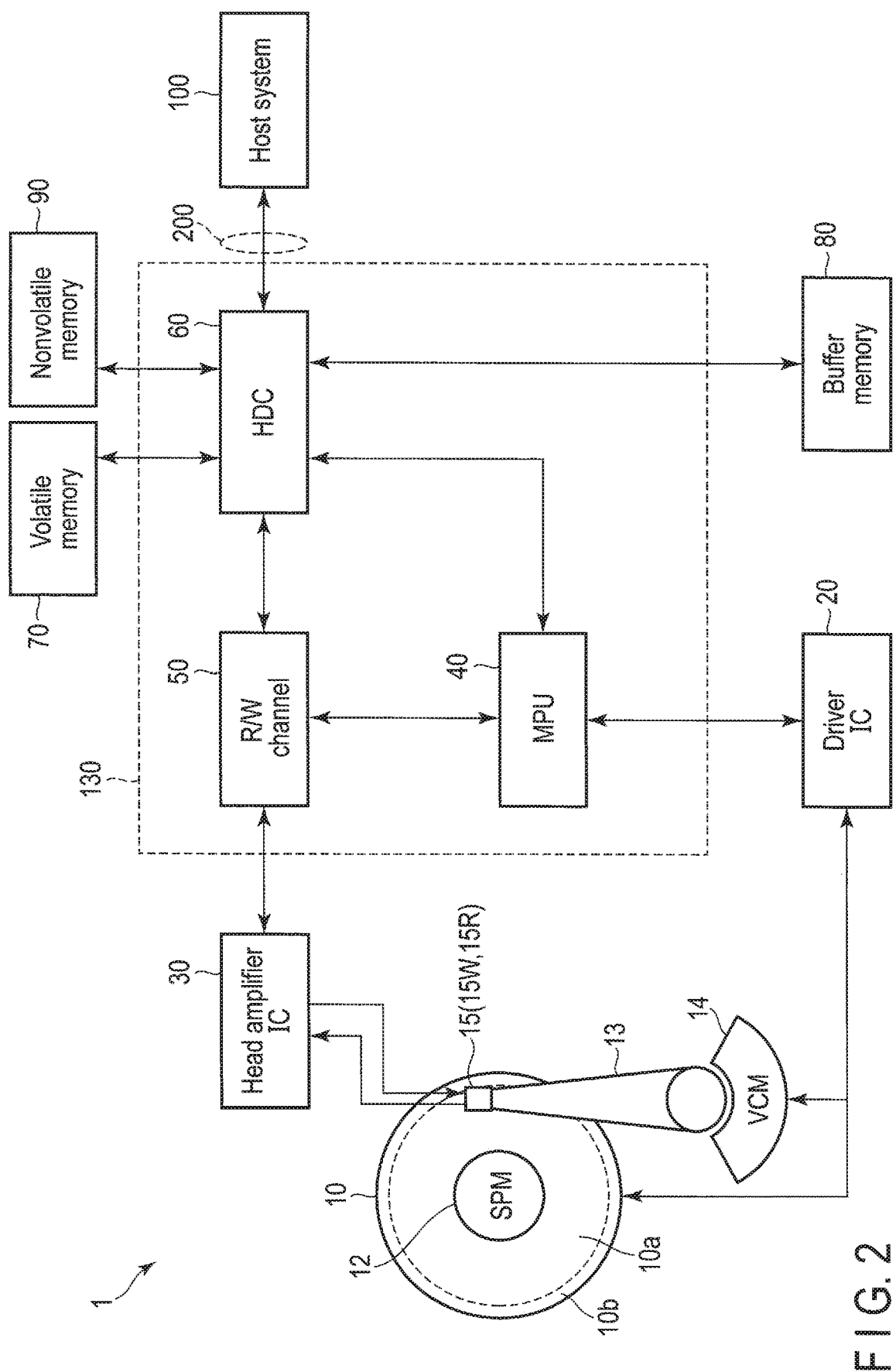
F I G. 2

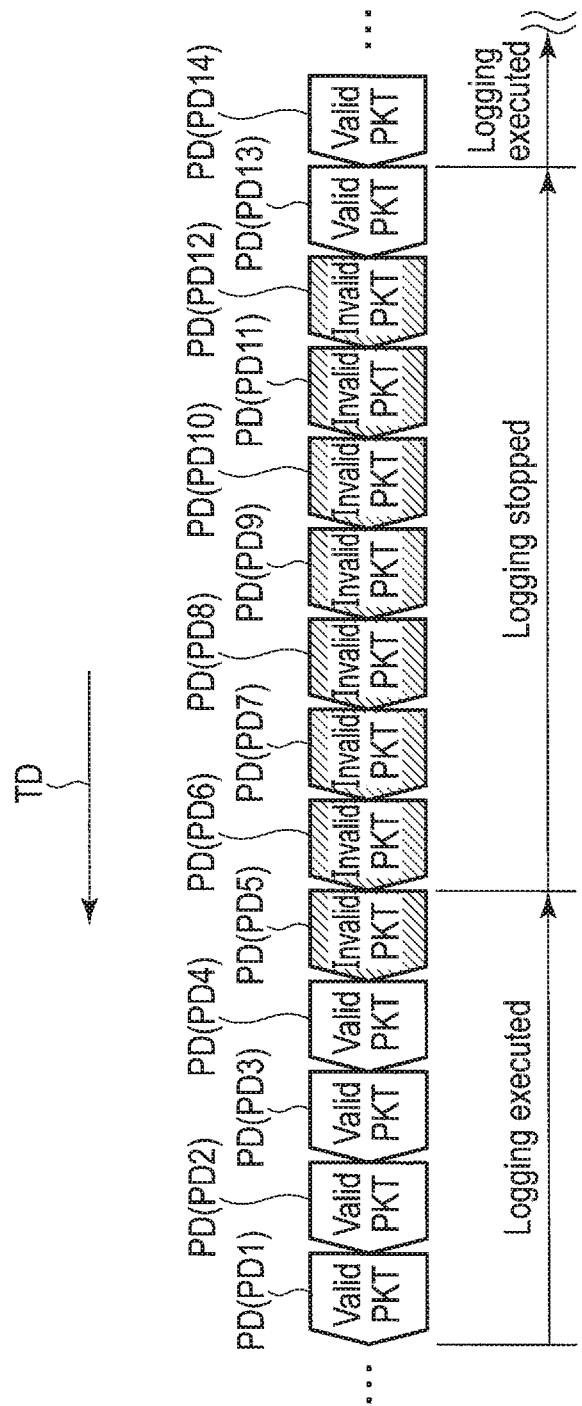
F I G. 4

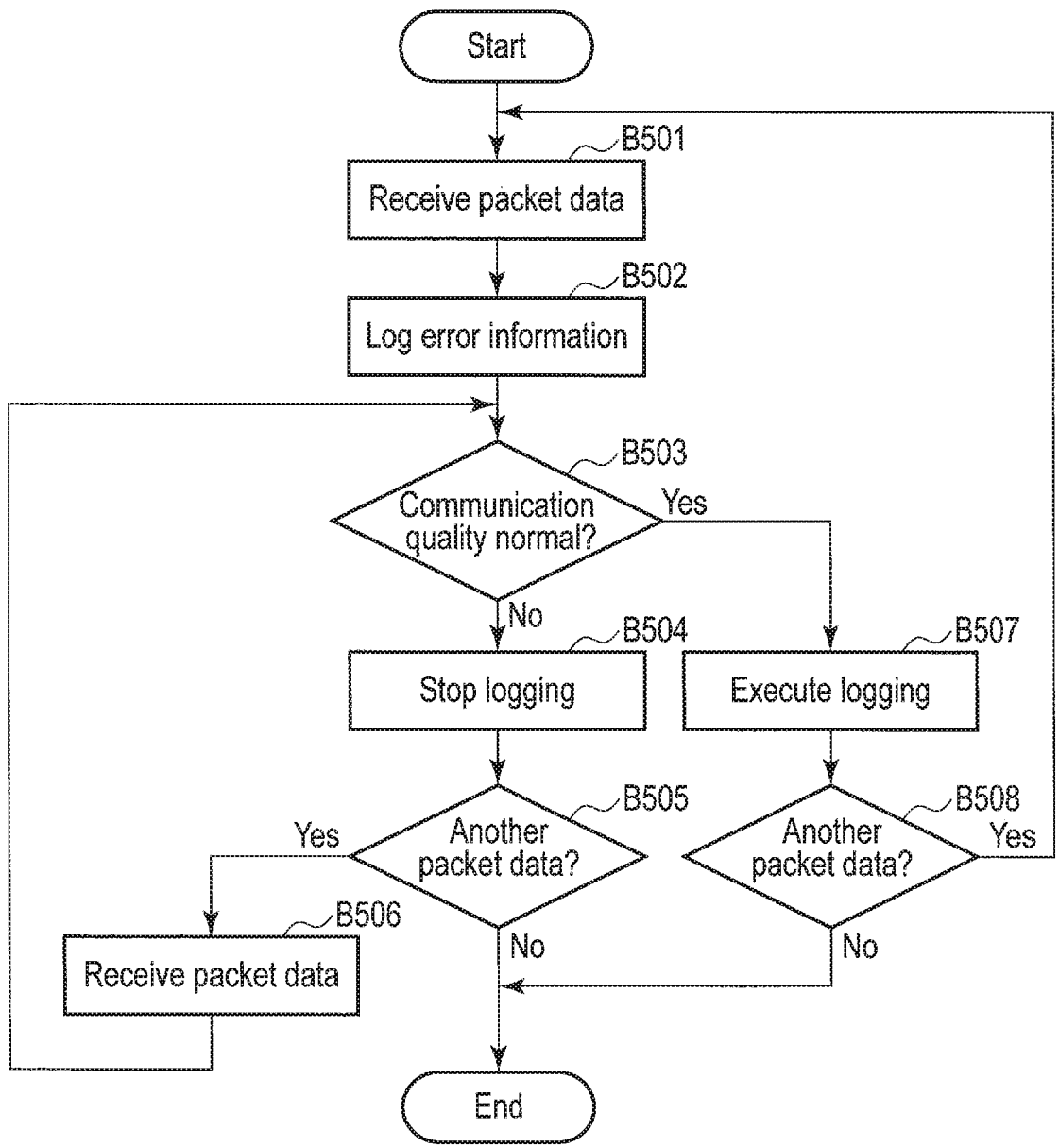
F I G. 5

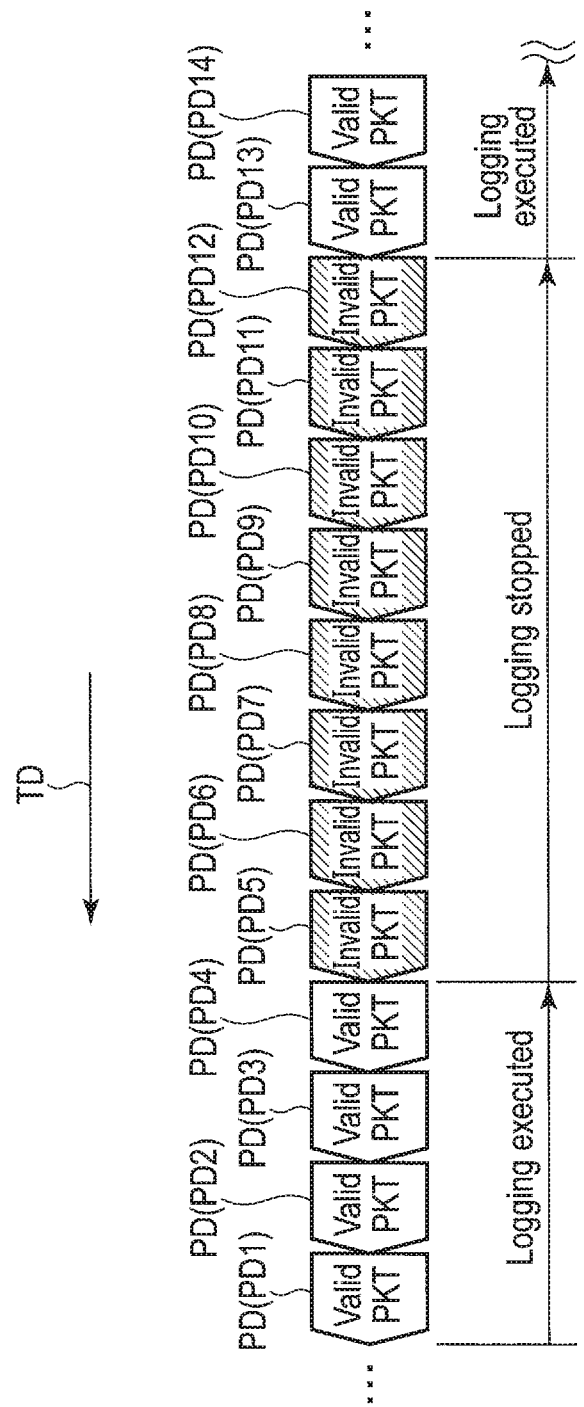
F I G. 6

ELECTRONIC COMMUNICATION DEVICE, MAGNETIC DISK DEVICE AND SERIAL COMMUNICATION METHOD

CROSS-REFERENCE TO RELATED APPLICATIONS

This application is based upon and claims the benefit of priority from Japanese Patent Application No. 2019-216692, filed Nov. 29, 2019, the entire contents of which are incorporated herein by reference.

FIELD

Embodiments described herein relate generally to an electronic communication device, a magnetic disk device and a serial communication method.

BACKGROUND

An electronic communication device has the function of logging, when detecting an error in data in units of packets (hereinafter referred to as packet data) in serial communication with the other electronic communication device, information about the error. When the boundary of packet data is misaligned by synchronization failure, etc., in serial communication with the other electronic communication device, since it takes time to reset the boundary of packet data, in some cases, the electronic communication device determines that an error continuously occurs in packet data transferred from the other electronic communication device, and continues logging information about the error. In such cases, the electronic communication device causes overflowing of a recording area to which the information about the error is logged.

BRIEF DESCRIPTION OF THE DRAWINGS

FIG. 2 is a block diagram showing the configuration of a magnetic disk device according to the first embodiment.

FIG. 4 is a schematic diagram showing an example of logging processing according to the first embodiment.

FIG. 5 is a flowchart showing an example of a serial communication method according to the first embodiment.

FIG. 6 is a schematic diagram showing an example of logging processing according to a modification 1.

DETAILED DESCRIPTION

In general, according to one embodiment, an electronic communication device comprises: a controller which controls, according to the number of bit data in which an error has occurred of packet data transferred in serial communication, whether to start logging of information about the error of the packet data or stop logging of information about the error of the packet data.

Embodiments will be described hereinafter with reference to the accompanying drawings. Note that the drawings are presented by way of example only and are not intended to limit the scope of the invention.

First Embodiment

Figure 1:
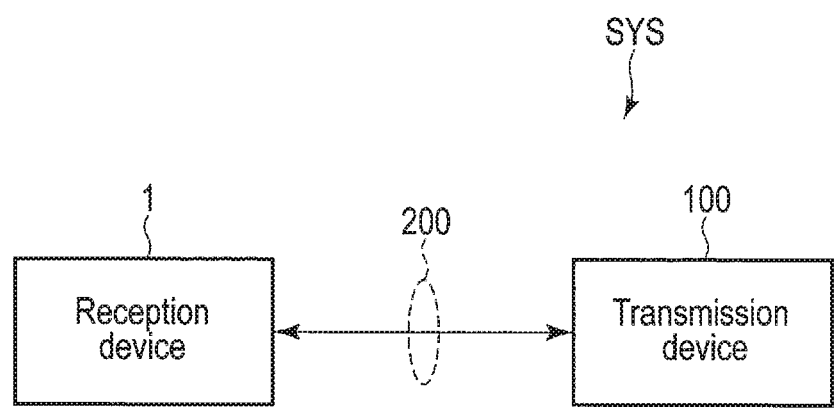
FIG. 1 is a block diagram showing a configuration example of a communication system according to the first embodiment.

FIG. 1 is a block diagram showing a configuration example of a communication system SYS according to the first embodiment.

The communication system SYS includes an electronic communication device (reception device) 1 and an electronic communication device (transmission device) 100. The reception device 1 and the transmission device 100 execute serial communication with each other via a transmission channel 200. The transmission channel 200 is a wired or wireless network. The transmission channel 200 may employ a standard such as Serial Attached SCSI (SAS) (registered trademark), Serial Advanced Technology Attachment (SATA) (registered trademark) or Universal Serial Bus (USB) (registered trademark). The transmission device 100 transmits serial data to the reception device 1 via the transmission channel 200. The transmission device 100 is, for example, a host system 100. The reception device 1 receives serial data transferred from the transmission device 100 via the transmission channel 200. The reception device 1 is, for example, a recording device 1. The recording device 1 includes a magnetic disk device (hard disk drive) (HDD) 1, a memory device (solid state drive) (SSD) 1 and the like. The reception device 1 will be hereinafter described as a magnetic disk device 1.

FIG. 2 is a block diagram showing the configuration of the magnetic disk device 1 according to the first embodiment.

The magnetic disk device 1 includes a head disk assembly (HDA) which will be described later, a driver IC 20, a head amplifier integrated circuit (hereinafter referred to as a head amplifier IC or a preamplifier) 30, a volatile memory 70, a buffer memory (buffer) 80, a nonvolatile memory 90, and a system controller 130 which is a single-chip integrated circuit. In addition, the magnetic disk device 1 is connected to the host system (host) 100.

The HDA includes a magnetic disk (hereinafter referred to as a disk) 10, a spindle motor (SPM) 12, an arm 13 on which a head 15 is mounted, and a voice coil motor (VCM) 14. The disk 10 is rotated by the spindle motor 12. The arm 13 and the VCM 14 constitute an actuator. The actuator controls the movement of the head 15 mounted on the arm 13 to an intended position on the disk 10 by the drive of the VCM 14. Two or more disks 10 and heads 15 may be disposed.

On the disk 10, in its recording area, a recording area 10a which can be used from the user, and a system area 10b to which information required for system management is written are allocated.

The head 15 includes a slider as a main body, and a write head 15W and a read head 15R mounted on the slider. The write head 15W writes data on the disk 10. The read head 15R reads data recorded on a data track of the disk 10. The head 15 writes data to the disk 10 in units of blocks, each of which includes at least one sector, and reads data in units of blocks. Here, the sector is the smallest unit of data written to the disk 10 or read from the disk 10.

The driver IC 20 controls the drive of the SPM 12 and the VCM 14 according to the control of the system controller 130 (more specifically, an MPU 40 which will be described later).

The head amplifier IC 30 includes a read amplifier and a write driver. The read amplifier amplifies a read signal read from the disk 10 and outputs it to the system controller 130 (more specifically, a read/write (R/W) channel 50 which will be described later). The write driver outputs a write current corresponding to write data output from the R/W channel 50 to the head 15.

The volatile memory 70 is a semiconductor memory which loses stored data when power supply is cut off. The nonvolatile memory 70 stores data, etc., required for processing in each module of the magnetic disk device 1. The volatile memory 70 is, for example, a dynamic random access memory (DRAM) or a synchronous dynamic random access memory (SDRAM).

The buffer memory 80 is a semiconductor memory which temporarily records data, etc., transmitted between the magnetic disk device 1 and the host 100. Note that the buffer memory 80 may be integrally composed with the volatile memory 70. The buffer memory 80 is, for example, a DRAM, a static random access memory (SRAM), an SDRAM, a ferroelectric random access memory (FeRAM), a magnetoresistive random access memory (MRAM) or the like.

The nonvolatile memory 90 is a semiconductor memory which records stored data even when power supply is cut off. The nonvolatile memory 90 is, for example, a NOR or NAND flash read only memory (ROM) (FROM).

The system controller (controller) 130 is realized by using, for example, a large-scale integrated circuit (LSI) called a system-on-a-chip (SoC) in which a plurality of elements are integrated on a single chip. The system controller 130 includes a microprocessor (MPU) 40, a read/write (R/W) channel 50 and a hard disk controller (HDC) 60. The system controller 130 is connected to the driver IC 20, the head amplifier IC 30, the nonvolatile memory 70, the buffer memory 80, the nonvolatile memory 90 and the host system 100.

The MPU 40 is a main controller which controls each module of the magnetic disk device 1. The MPU 40 controls the VCM 14 via the driver IC 20, and executes servo control for positioning of the head 15. In addition, the MPU 40 controls a data write operation on the disk 10, and selects a storage designation for write data transferred from the host 100. The MPU 40 executes processing based on firmware. The MPU 40 is connected to each module of the magnetic disk device 1. The MPU 40 is connected to the R/W channel 50 and the HDC 60.

The R/W channel 50 executes signal processing of read data and write data according to instructions from the MPU 40. The read data and the write data will also be referred to simply as data. The R/W channel 50 has a circuit or function for measuring the signal quality of read data. The R/W channel 50 is connected to the head amplifier IC 30, the MPU 40 and the HDC 60.

The HDC 60 controls data transfer between the host 100 and the R/W channel 50 according to instructions from the MPU 40. For example, the HDC 60 stores user data transferred from the host 100 in the buffer memory 80 once, and outputs it to the R/W channel 50. In addition, the HDC 60 stores read data read from the disk 10 in the buffer memory 80 once, and outputs it to the host 100. The HDC 60 is connected to the MPU 40, the R/W channel 50, the volatile memory 70, the buffer memory 80, the nonvolatile memory 90 and the host 100.

Figure 3:
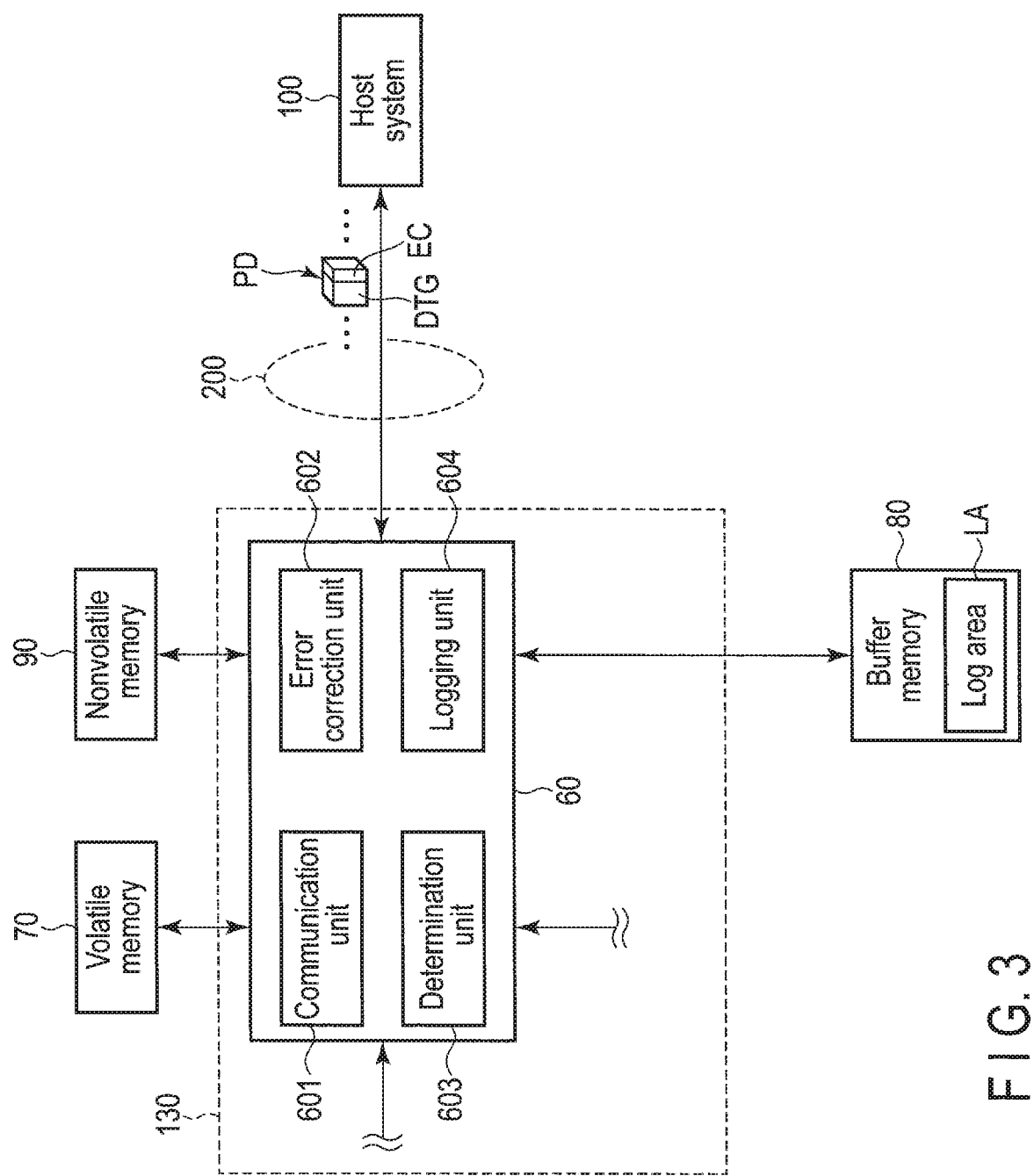
FIG. 3 is a block diagram showing a configuration example of an HDC according to the first embodiment.

FIG. 3 is a block diagram showing a configuration example of the HDC 60 according to the present embodiment.

The HDC 60 includes a communication unit 601, an error correction unit 602, a determination unit 603 and a logging unit 604. The HDC 60 may include the modules, for example, the communication unit 601, the error correction unit 602, the determination unit 603, the logging unit 604 and the like as circuits. In addition, the HDC 60 may execute processing of the modules, for example, the communication unit 601, the error correction unit 602, the determination unit 603, the logging unit 604 and the like on firmware.

The communication unit 601 controls data transfer by serial communication to/from the host 100. The communication unit 601 controls transmission of data in units of packets (or frames) (hereinafter referred to also as packet data) PD to/from the host 100 via the transmission channel 200. The packet data PD includes a given number (or volume), for example, a given number of bits of data DTG, and an error correction code EC. Note that the error correction code EC may be transferred from the host 100 to the HDC 60 each time a given number (hereinafter referred to also as a number of packets) of packet data PD are transferred, as packet data different from packet data PD corresponding to the user data, etc. The packet data PD may include data indicating the boundary of packet data (hereinafter referred to also as boundary data). The boundary data may be transferred from the host 100 to the HDC 60 each time a given number of packets of packet data are transferred, as packet data different from packet data PD corresponding to the user data, etc., and packet data corresponding to the error correction code EC. The transmission channel 200 is a wiring line which electrically connects the host 100 and the HDC 60. The transmission channel 200 employs, for example, the SAS Protocol Layer-4 (SPL-4) standard. The error correction code EC includes, for example, a forward error correction (FEC) code.

The error correction unit 602 executes error correction processing. The error correction unit 602 can execute error correction of a given number (or volume), for example, two symbols of error data or less of each packet data PD based on each error correction code EC corresponding to each packet data PD. Note that the error correction unit 602 may execute error correction of three symbols of error data or more of each packet data PD based on each error correction code EC corresponding to each packet data PD. For example, when the boundary of packet data PD transferred from the host 100 is misaligned by synchronization failure, etc., in some cases, the error correction unit 602 mistakenly executes error correction of packet data PD whose boundary is misaligned.

The determination unit 603 determines (sets) the boundary of packet data PD transferred from the host 100 to the HDC 60. The determination unit 602 executes synchronization of the boundary of packet data PD. Note that the determination unit 603 may determine (set) the boundary of packet data PD transferred from the host 100 based on the boundary data.

The determination unit 603 detects error data, for example, data in units of bits (hereinafter referred to also as bit data) in which an error has occurred for each packet data PD transferred from the host 100, and counts error data for each packet data.

The determination unit 603 determines whether each packet data PD is packet data PD containing no error data or little error data (hereinafter referred to as valid packet data) or packet data PD containing error data which cannot be corrected (hereinafter referred to as invalid packet data). For example, the determination unit 603 determines whether each packet data PD is valid packet data or invalid packet data based on the number, for example, the number of bits of error data of each packet data PD.

For example, when the determination unit 603 detects no error data in given packet data PD or a given number (hereinafter referred to also as a validity threshold), for example, two symbols of error data or less in given packet data PD, the determination unit 603 determines that the packet data PD is valid packet data PD.

For example, when the determination unit 603 detects more error data than the validity threshold, for example, two symbols in given packet data PD, the determination unit 603 determines that the packet data PD is invalid packet data PD.

For example, the determination unit 603 sets the validity threshold. Note that the determination unit 603 may set the validity threshold for each packet data PD or arbitrarily change the validity threshold. The validity threshold corresponds to, for example, the number of error data which can be corrected based on the error correction code EC. Note that the validity threshold may correspond to the number of error data less than or equal to the number of error data which can be corrected based on the error correction code EC or may correspond to the number of error data less than the number of error data which can be corrected based on the error correction code EC.

For example, when the determination unit 603 determines that a plurality of consecutive packet data PD are invalid packet data, the determination unit 603 can determine that the boundary of packet data PD transferred from the host 100 is misaligned by synchronization failure, etc. When the determination unit 603 determines that the boundary of packet data PD is misaligned, the determination unit 603 transitions from a state of determining the boundary of packet data PD and executing communication (for example, an SP_PS2:SyncAcquired state) to a state of determining (or setting) the boundary of packet data PD (for example, an SP_PS0:AcquireSync state). In other words, when the determination unit 603 determines that the boundary of packet data PD is misaligned, the determination unit 603 stops communication once, and resets the boundary of packet data PD. Note that the determination unit 603 may have, for example, a phy layer SPL packet synchronization (SP_PS) state machine. The SP_PS state machine has states, for example, SP_PS0:AcquireSync, SP_PS1:Valid1, SP_PS2:SyncAcquired, SP_PS3:Lost1, SP_PS4:LostRecovered, SP_PS5:Lost2 and SP_PS6:Lost3. For example, when the SP_PS state machine is in the SP_PS2:SyncAcquired state and if a plurality of packet data are received in the order of valid packet data, invalid packet data, invalid data, valid packet data, invalid packet data, valid packet data and valid packet data, the SP_PS state machine may transition in the order of SP_PS2:SyncAcquired, SP_PS3:Lost1, SP_PS5:Lost2, SP_PS4:LostRecovered, SP_PS3:Lost1, PS4:LostRecovered and SP_PS2:SyncAcquired.

For example, when the determination unit 603 is in the state of setting the boundary of packet data PD (for example, the SP_PS0:AcquireSync state) and if the determination unit 603 determines that one or a plurality of consecutive packet data PD are valid packet data, the determination unit 603 transitions from the state of setting the boundary of packet data PD (for example, the SP_PS0:AcquireSync state) to a given state, for example, the SP_PS4:LostRecovered state or the state of setting the boundary of packet data PD and executing communication (for example, the SP_PS2:SyncAcquired state).

For example, when the determination unit 603 mistakenly executes error correction of packet data PD whose boundary is misaligned, the determination unit 603 may determine that the mistakenly corrected packet data PD is valid packet data PD, and may transition from the state of setting the boundary of packet data PD and executing communication (for example, the SP_PS2:SyncAcquired state) to a given state, for example, the SP_PS4:LostRecovered state or the state of determining the boundary of packet data PD and executing communication (for example, the SP_PS2:SyncAcquired state).

The determination unit 603 determines whether the communication quality is normal or not. The determination unit 603 determines whether the communication quality is normal or not based on the number of error data of each packet data. For example, when the determination unit 603 determines that the number of error data of given packet data PD is less than or equal to the validity threshold, that is, given packet data PD is valid data, the determination unit 603 determines that the communication quality of the packet data PD is normal. When the determination unit 603 determines that the number of error data of given packet data PD is greater than the validity threshold, that is, given packet data PD is invalid packet data, the determination unit 603 determines that the communication quality of the packet data PD is not normal.

The logging unit 604 controls whether or not to log (record) the position (or number) of error data and information such as the content of an error (hereinafter referred to also as error information) to (on) a given recording area (hereinafter referred to also as a logging area) LA. The "logging" includes "logging given data, for example, log data (also referred to simply as log)", "recording log" and the like. Note that the "logging" may also include "counting up the number, for example, the number of bits of error data in given packet data PD" and the like. The "logging (recording) given data (log data or log) to (on) the logging area LA" will also be referred to simply as "logging" or "logging processing". In the example shown in FIG. 3, the logging area LA is included in the buffer 80. Alternatively, the logging area LA may be included in the volatile memory 70, the nonvolatile memory 90, the logging unit 604 or the like.

The logging unit 604 controls whether to execute (start or resume) logging (or logging processing) of the error information of packet data PD or stop (suspend or end) logging based on the number of error data of packet data PD. For example, when the logging unit 604 determines that the communication quality of the packet data PD is normal, the logging unit 604 executes logging (or logging processing) of the error information of packet data PD. For example, when the communication quality of given packet data PD is found normal based on the determination result of the determination unit 603, the logging unit 604 executes logging of the error information of another packet data PD transferred after this packet data PD. For example, when the communication quality of the packet data PD is found not normal, the logging unit 604 stops logging of the error information of packet data PD. For example, when the communication quality of given packet data PD is found not normal based on the determination result of the determination unit 603, the logging unit 604 stops logging of another packet data PD transferred after this packet data PD.

FIG. 4 is a schematic diagram showing an example of the logging processing according to the present embodiment. In FIG. 4, the packet data PD include packet data PD1, PD2, PD3, PD4, PD5, PD6, PD7, PD8, PD9, PD10, PD11, PD12, PD13 and PD14. In FIG. 4, a direction in which the packet data PD is transferred (hereinafter referred to also as a transfer direction) TD is indicated. In FIG. 4, the packet data PD are transferred in the order of the packet data PD1 to PD14 from the host 100 to the HDC 60. In FIG. 4, the packet data PD1 to PD4, PD13 and PD14 are valid packet data (Valid PKT). In FIG. 4, the packet data PD5 to PD12 are invalid packet data (Invalid PKT).

The HDC 60 receives the packet data PD1 and logs the error information of the packet data PD1 to the logging area LA. The HDC 60 determines whether the number of error data of the packet data PD1 is greater than the validity threshold or less than or equal to the validity threshold. When the HDC 60 determines that the number of error data of the packet data PD1 is less than or equal to the validity threshold, the HDC 60 determines that the communication quality of the packet data PD is normal. When the HDC 60 determines that the communication quality of the packet data PD is normal, the HDC 60 executes (starts) logging of the error information of the packet data PD2 transferred from the host 100 after the packet data PD1 to the logging area LA.

Until the HDC 60 determines that the communication quality of the packet data PD is not normal, the HDC 60 logs the error information of each packet data PD transferred from the host 100 to the logging area LA. In the example shown in FIG. 4, the HDC 60 logs the error information of each of the packet data PD2 to PD5 to the logging area LA.

The HDC 60 receives the packet data PD4 and logs the error information of the packet data PD4 to the logging area LA. The HDC 60 determines whether the number of error data of the packet data PD4 is greater than the validity threshold or less than or equal to the validity threshold. When the HDC 60 determines that the number of error data of the packet data PD4 is less than or equal to the validity threshold, the HDC 60 determines that the communication quality of the packet data PD is normal. When the HDC 60 determines that the communication quality of the packet data PD is normal, the HDC 60 executes logging of the error information of the packet data PD5 transferred from the host 100 after the packet data PD4 to the logging area LA.

The HDC 60 receives the packet data PD5 and logs the error information of the packet data PD5 to the logging area LA. The HDC 60 determines whether the number of error data of the packet data PD5 is greater than the validity threshold or less than or equal to the validity threshold. When the HDC 60 determines that the number of error data of the packet data PD5 is greater than the validity threshold, the HDC 60 determines that the communication quality is not normal. When the HDC 60 determines that the communication quality of the packet data PD is not normal, the HDC 60 stops logging of the error information of the packet data PD6 transferred from the host 100 to the HDC 60 after the packet data PD5 to the logging area LA.

Until the HDC 60 determines that the communication quality of the packet data PD is normal, the HDC 60 stops logging of each error information of each packet data PD transferred from the host 100 to the logging area LA. In the example shown in FIG. 4, the HDC 60 stops logging of the error information of each of the packet data PD6 to PD13 to the logging area LA.

The HDC 60 receives the packet data PD12 and does not log the error information of the packet data PD12 to the logging area LA. The HDC 60 determines whether the number of error data of the packet data PD12 is greater than the validity threshold or less than or equal to the validity threshold. When the HDC 60 determines that the number of error data of the packet data PD12 is greater than the validity threshold, the HDC 60 determines that the communication quality of the packet data PD is not normal. When the HDC 60 determines that the communication quality of the packet data PD is not normal, the HDC 60 stops logging of the error information of the packet data PD13 transferred from the host 100 after the packet data PD12 to the logging area LA.

The HDC 60 receives the packet data PD13 and does not log the error information of the packet data PD13 to the logging area LA. The HDC 60 determines whether the number of error data of the packet data PD13 is greater than the validity threshold or less than or equal to the validity threshold. When the HDC 60 determines that the number of error data of the packet data PD13 is less than or equal to the validity threshold, the HDC 60 determines that the communication quality of the packet data PD13 is normal. When the HDC 60 determines that the communication quality of the packet data PD13 is normal, the HDC 60 executes logging of the error information of the packet data PD14 transferred from the host 100 after the packet data PD13 to the logging area LA.

As shown in FIG. 4, when the communication quality of the packet data PD is found not normal, by stopping logging of the error information of the packet data PD transferred after the packet data PD whose communication quality is found not normal, it is possible to suppress logging of the error information of a plurality of invalid packet data PD which are caused by a misalignment of the boundary of packet data PD to the logging area LA, and logging of the error information of a plurality of invalid packet data PD which are caused by a misalignment of the boundary of packet data PD which is caused by invalid packet data PD which is mistakenly subjected to error correction to the logging area LA. By suppressing logging of the error information of the plurality of invalid packet data which are caused by the misalignment of the boundary of the packet data PD to the logging area LA, it is possible to suppress overflowing of the logging area LA. In addition, by not logging the error information of the plurality of invalid packet data PD which are caused by the misalignment of the boundary of the packet data PD to the logging area LA, it is possible to calculate an error rate without using the error information of the plurality of packet data PD which are caused by the misalignment of the boundary of the packet data PD. By calculating the error rate without using the error information of the plurality of invalid packet data PD which are caused by the misalignment of the boundary of the packet data PD as described above, it is possible to improve the accuracy of the error rate.

FIG. 5 is a flowchart showing an example of a serial communication method according to the present embodiment.

The system controller 130 receives given packet data PD from the host 100 (B501) and logs the error information of this packet data PD to the logging area LA (B502). The system controller 130 determines whether the communication quality of the packet data PD is normal or not (B503). For example, the system controller 130 determines whether the number of error data of the given packet data PD is greater than the validity threshold or less than or equal to the validity threshold. When the system controller 130 determines that the communication quality of the packet data PD is not normal (NO in B503), the system controller 130 stops logging of the error information of packet data PD transferred after the given packet data PD to the logging area LA (B504). For example, when the system controller 130 determines that the number of error data of the given packet data PD is greater than the validity threshold, and determines that the communication quality of the packet data PD is not normal, the system controller 130 stops logging of the error information of packet data transferred after the given packet data PD to the logging area LA. The system controller 130 determines whether there is another packet data PD transferred after the given data PD or not (B505). When the system controller 130 determines that there is another packet data PD (YES in B505), the system controller 130 receives the given packet data PD (B506) and proceeds to the processing of B503. When the system controller 130 determines that there is not any other packet data PD (NO in B505), the system controller 130 ends the processing.

When the system controller 130 determines that the communication quality of the packet data PD is normal (YES in B503), the system controller 130 executes (or starts) logging of the error information of packet data PD transferred after the given packet data PD to the logging area LA (B507). For example, when the system controller 130 determines that the number of error data of the given packet data PD is less than or equal to the validity threshold, and determines that the communication quality of the packet data PD is normal, the system controller 130 executes logging of the error information of packet data transferred after the given packet data PD to the logging area LA. The system controller 130 determines whether there is another packet data PD transferred after the given packet data PD or not (B508). When the system controller 130 determines that there is another packet data PD (YES in B508), the system controller 130 proceeds to the processing of B501. When the system controller 130 determines that there is not any other packet data PD (NO in B508), the system controller 130 ends the processing.

According to the present embodiment, the electronic communication device (magnetic disk device) 1 executes serial communication with the electronic communication device (host) 100 via the transmission channel 200. The electronic communication device 1 determines whether the communication quality of the packet data PD transferred from the electronic communication device 100 is normal or not based on the number (or volume) of error data of the packet data PD. When the electronic communication device 1 determines that the communication quality of the packet data PD is not normal, the electronic communication device 1 stops logging of the error information of the packet data PD to the logging area LA. For example, when the electronic communication device 1 determines that the number of error data of packet data PD is greater than the validity threshold, the electronic communication device 1 determines that the communication quality of the packet data PD is not normal, and stops logging of the error information of the packet data PD to the logging area LA. By stopping logging when determining that the communication quality of the packet data PD is not normal as described above, the electronic communication device 1 can suppress logging of the error information of a plurality of invalid packet data PD which are caused by a misalignment of the boundary of packet data PD, etc., to the logging area LA. In addition, by not logging the error information of a plurality of invalid packet data PD which are caused by a misalignment of the boundary of packet data PD, etc., to the logging area LA, the electronic communication device 1 can improve the accuracy of an error rate. Therefore, the electronic communication device 1 can improve communication performance.

Next, electronic communication devices according to other embodiments and modifications will be described. In the other embodiments and modifications, the same parts as those of the first embodiment described above are denoted by the same reference numbers, and detailed descriptions of them are omitted.

Modification 1

An electronic communication device (magnetic disk device) 1 according to a modification 1 of the first embodiment is different from the electronic communication device 1 of the first embodiment in the processing of serial communication.

When the HDC 60 determines that the number (or volume) of error data of the packet data PD is less than or equal to the validity threshold, the HDC 60 determines that the communication quality of the packet data PD is normal. For example, when the HDC 60 determines that the communication quality of given packet data PD is normal, the HDC 60 executes logging of error information from this packet data PD. When the HDC 60 determines that the number (or volume) of error data of the packet data PD is greater than the validity threshold, the HDC 60 determines that the communication quality of the packet data PD is not normal. For example, when the HDC 60 determines that the communication quality of given packet data PD is not normal, the HDC 60 stops logging of error information of at least one packet data transferred after this packet data PD.

FIG. 6 is a schematic diagram showing an example of logging processing according to the modification 1. In FIG. 6, the packet data PD include packet data PD1 to PD14.

The HDC 60 receives the packet data PD1, and determines whether the number of error data of the packet data PD1 is greater than the validity threshold or less than or equal to the validity threshold. When the HDC 60 determines that the number of error data of the packet data PD1 is less than or equal to the validity threshold, the HDC 60 determines that the communication quality of the packet data PD is normal. When the HDC 60 determines that the communication quality of the packet data PD is normal, the HDC 60 logs the error information of the packet data PD1 to the logging area LA.

The HDC 60 logs each error information of each packet data PD to the logging area LA until the HDC 60 determines that the communication quality of given packet data PD is not normal. In the example shown in FIG. 6, the HDC 60 logs the error information of each of the packet data PD2 to PD4 to the logging area LA until the HDC 60 determines that the communication quality of given packet data PD is not normal.

The HDC 60 receives the packet data PD5, and determines that the number (or volume) of error data of the packet data PD5 is greater than the validity threshold or less than or equal to the validity threshold. When the HDC 60 determines that the number of error data of the packet data PD5 is greater than the validity threshold, the HDC 60 determines that the communication quality of the packet data PD is not normal. When the HDC 60 determines that the communication quality of the packet data PD is not normal, the HDC 60 stops logging of the error information of the packet data PD5 to the logging area LA.

The HDC 60 stops logging of each error information of each packet data PD until the HDC 60 determines that the communication quality of given packet data PD is normal.

In the example shown in FIG. 6, the HDC 60 stops logging of the error information of each of the packet data PD6 to PD12 until the HDC 60 determines that the communication quality of given packet data PD is normal.

The HDC 60 receives the packet data PD13, and determines whether the number of error data of the packet data PD13 is greater than the validity threshold or less than or equal to the validity threshold. When the HDC 60 determines that the number of error data of the packet data PD13 is less than or equal to the validity threshold, the HDC 60 determines that the communication quality of the packet data PD is normal. When the HDC 60 determines that the communication quality of the packet data PD is normal, the HDC 60 logs the error information of the packet data PD13 to the logging area LA.

The HDC 60 logs each error information of each packet data PD to the logging area LA until the HDC 60 determines that the communication quality of given packet data PD is not normal. In the example shown in FIG. 6, the HDC 60 logs the error information of at least one packet data PD from the packet data PD14 until the HDC 60 determines that the communication quality of given packet data PD is not normal.

Figure 7:
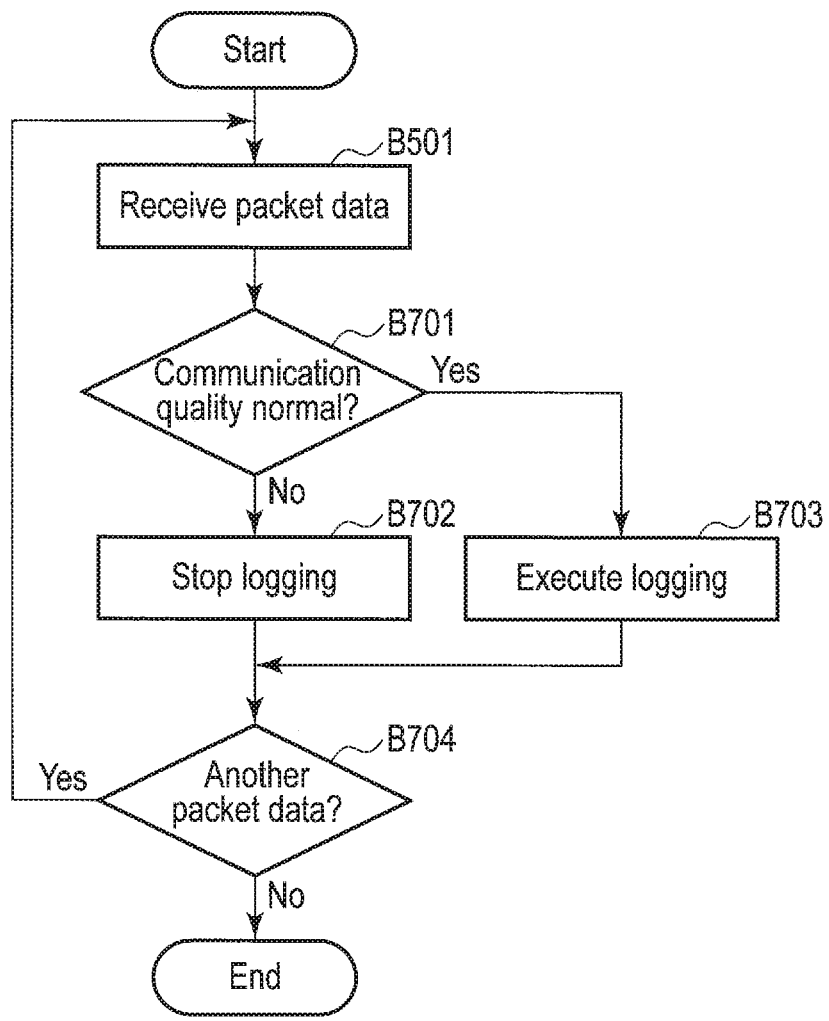
FIG. 7 is a flowchart showing an example of a serial communication method according to the modification 1.

FIG. 7 is a flowchart showing an example of a serial communication method according to the modification 1.

The system controller 130 receives given packet data PD from the host 100 (B501), and determines whether the communication quality of the packet data PD is normal or not (B701). For example, the system controller 130 determines whether the number of error data of the given packet data PD is greater than the validity threshold or less than or equal to the validity threshold. When the system controller 130 determines that the communication quality of the packet data PD is not normal (NO in B701), the system controller 130 stops logging of the error information of the packet data PD from the given packet data PD to the logging area LA (B702). For example, when the system controller 130 determines that the number of error data of the given packet data PD is greater than the validity threshold, and determines that the communication quality of the packet data PD is not normal, the system controller 130 stops logging of the error information of this packet data PD to the logging area LA. The system controller 130 determines whether there is another packet data PD transferred after the given packet data PD or not (B704). When the system controller 130 determines that there is another packet data PD (YES in B704), the system controller 130 proceeds to the processing of B501.

When the system controller 130 determines that the communication quality of the packet data PD is normal (YES in B701), the system controller 130 executes logging of the error information from the given packet data PD to the logging area LA (B703). For example, when the system controller 130 determines that the number of error data of the given packet data PD is less than or equal to the validity threshold, and determines that the communication quality of the packet data PD is normal, the system controller 130 logs the error information of this packet data PD to the logging area LA. The system controller 130 proceeds to the processing of B704.

According to the modification 1, the electronic communication device (magnetic disk device) 1 determines whether the communication quality of the packet data PD is normal or not based on the number (or volume) of error data of the packet data PD transferred from the electronic communication device 100. When the electronic communication device 1 determines that the communication quality of the packet data PD is not normal, the electronic communication device 1 stops logging of the error information of this packet data PD to the logging area LA. Therefore, the electronic communication device 1 can improve communication performance.

Second Embodiment

An electronic communication device (magnetic disk device) 1 according to the second embodiment is different from the electronic communication devices 1 of the first embodiment and the modification 1 in the processing of serial communication.

The HDC 60 counts the number of packets of invalid packet data and the number of packets of valid data transferred from the host 100.

When the HDC 60 executes logging of the error information of packet data PD, the HDC 60 determines whether the number of packets of consecutive invalid packet data transferred from the host 100 (hereinafter referred to also as the number of consecutive invalid data) is greater than or equal to a given number (hereinafter referred to also as a consecutive invalid data threshold) or less than the consecutive invalid data threshold. When the HDC 60 determines that the number of consecutive invalid data is less than the consecutive invalid data threshold, the HDC 60 determines that the communication quality of the packet data PD is normal. When the HDC 60 determines that the communication quality of the packet data PD is normal, the HDC 60 executes logging of the error information of packet data PD transferred after the last invalid packet data (hereinafter referred to also as the last invalid data) PD of the plurality of consecutive invalid packet data transferred consecutively from the host 100. Note that, when the HDC 60 determines that the communication quality of the packet data PD is normal, the HDC 60 may execute logging of the error information of packet data PD from the last invalid data. When the HDC 60 determines that the number of consecutive invalid data is greater than or equal to the consecutive invalid data threshold, the HDC 60 determines that the communication quality of the packet data PD is not normal. When the HDC 60 determines that the communication quality of the packet data PD is not normal, the HDC 60 stops logging of the error information of packet data PD transferred after the last invalid data PD. Note that, when the HDC 60 determines that the communication quality of the packet data PD is not normal, the HDC 60 may stop logging of the error information of packet data PD from the last invalid data PD. In addition, the HDC 60 may arbitrarily change the consecutive invalid data threshold.

When the HDC 60 stops logging of the error information of packet data PD, the HDC 60 determines whether the number of packets of consecutive valid packet data transferred from the host 100 (hereinafter referred to also as the number of consecutive valid data) is greater than or equal to a given number (hereinafter referred to also as a consecutive valid data threshold) or less than the consecutive valid data threshold. When the HDC 60 determines that the number of consecutive valid data is less than the consecutive valid data threshold, the HDC 60 determines that the communication quality of the packet data PD is not normal. When the HDC 60 determines that the communication quality of the packet data PD is not normal, the HDC 60 stops logging of the error information of packet data PD transferred after the last valid packet data (hereinafter referred to also as the last valid data) PD of the plurality of consecutive valid packet data transferred consecutively from the host 100. Note that, when the HDC 60 determines that the communication quality of the packet data PD is not normal, the HDC 60 may stop logging of the error information of the packet data PD from the last valid data PD. When the HDC 60 determines that the number of consecutive valid data is greater than or equal to the consecutive valid data threshold, the HDC 60 determines that the communication quality of the packet data PD is normal. When the HDC 60 determines that the communication quality of the packet data PD is normal, the HDC 60 executes logging of the error information of packet data PD transferred after the last valid data PD of the plurality of consecutive valid packet data PD transferred consecutively from the host 100. Note that, when the HDC 60 determines that the communication quality of the packet data PD is normal, the HDC 60 may execute logging of the error information of the packet data PD from the last valid data PD. In addition, the HDC 60 may arbitrarily change the consecutive valid data threshold.

Figure 8:
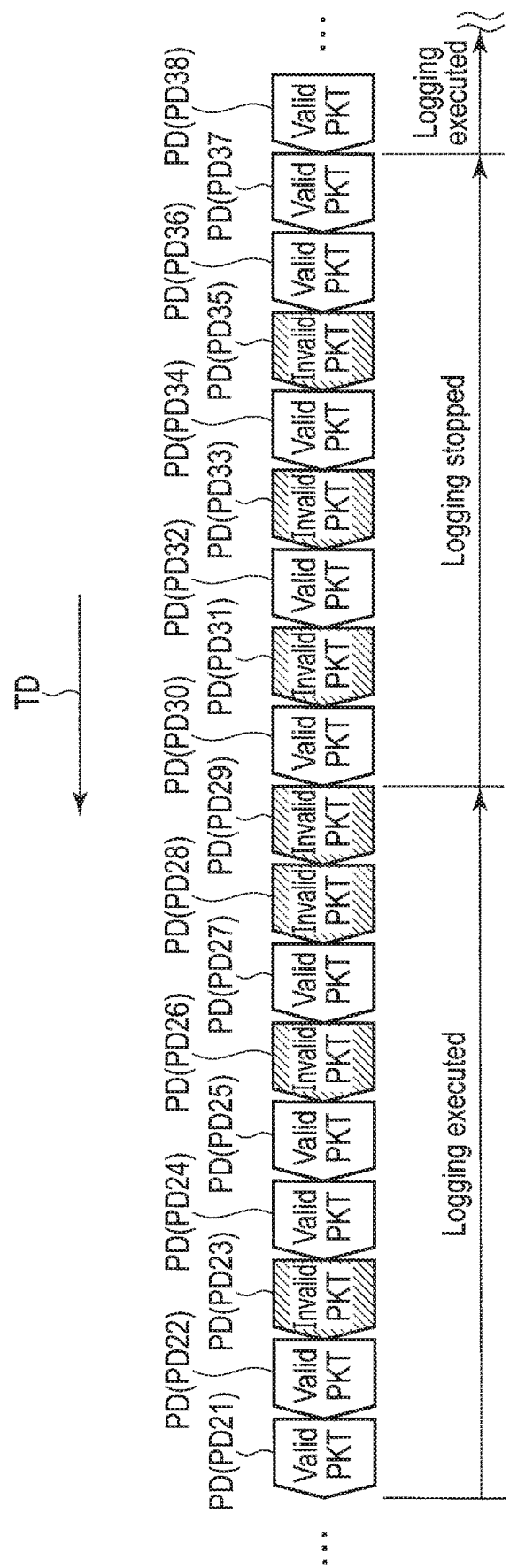
FIG. 8 is a schematic diagram showing an example of logging processing according to the second embodiment.

FIG. 8 is a schematic diagram showing an example of logging processing according to the second embodiment. In FIG. 8, the packet data PD include packet data PD21, PD22, PD23, PD24, PD25, PD26, PD27, PD28, PD29, PD30, PD31, PD32, PD33, PD34, PD35, PD36, PD37 and PD38. In FIG. 8, the packet data PD are transferred from the host 100 to the HDC 60 in the order of the packet data PD21 to PD38. In FIG. 8, the packet data PD21, PD22, PD24, PD25, PD27, PD30, PD32, PD34, PD36, PD37 and PD38 are valid packet data (Valid PKT). In FIG. 8, the packet data PD23, PD26, PD28, PD29, PD31, PD33 and PD35 are invalid packet data (Invalid PKT). In FIG. 8, the consecutive invalid data threshold is, for example, two packets (or frames). Note that the consecutive invalid data threshold may be greater than or equal to three packets (or frames). In addition, in FIG. 8, the consecutive valid data threshold is, for example, two packets (or frames). Note that the consecutive valid data threshold may be greater than or equal to three packets (or frames).

The HDC 60 logs the error information of each of the packet data PD21 to PD29 to the logging area LA. The HDC 60 counts the invalid packet data PD28 and the invalid packet data PD29 transferred consecutively after the invalid packet data PD28, and sets the number of consecutive invalid data to two. The HDC 60 determines that the number of consecutive invalid data is greater than or equal to the consecutive invalid data threshold (=2), and determines that the communication quality of the packet data PD is not normal. The HDC 60 stops logging of the error information from the packet data PD30 transferred after the last invalid data PD29 of the invalid packet data PD28 and PD29 transferred consecutively from the host 100 to the logging area LA. Note that the HDC 60 may stop logging of the error information from the last invalid data PD29 of the invalid packet data PD28 and PD29 transferred consecutively from the host 100.

The HDC 60 stops logging of each of the packet data PD30 to PD37 to the logging area LA. The HDC 60 counts the valid packet data PD36 and the valid packet data PD37 transferred consecutively after the valid packet data PD36, and sets the number of consecutive valid data to two. The HDC 60 determines that the number of consecutive valid data is greater than or equal to the consecutive valid data threshold (=2), and determines that the communication quality of the packet data PD is normal. The HDC 60 executes logging of the error information from the packet data PD38 transferred after the last valid data PD37 of the valid packet data PD36 and PD37 transferred consecutively from the host 100 to the logging area LA. Note that the HDC 60 may stop logging of the error information from the last valid data PD37 of the valid packet data PD36 and PD37 transferred consecutively from the host 100 to the logging area LA.

Figure 9:
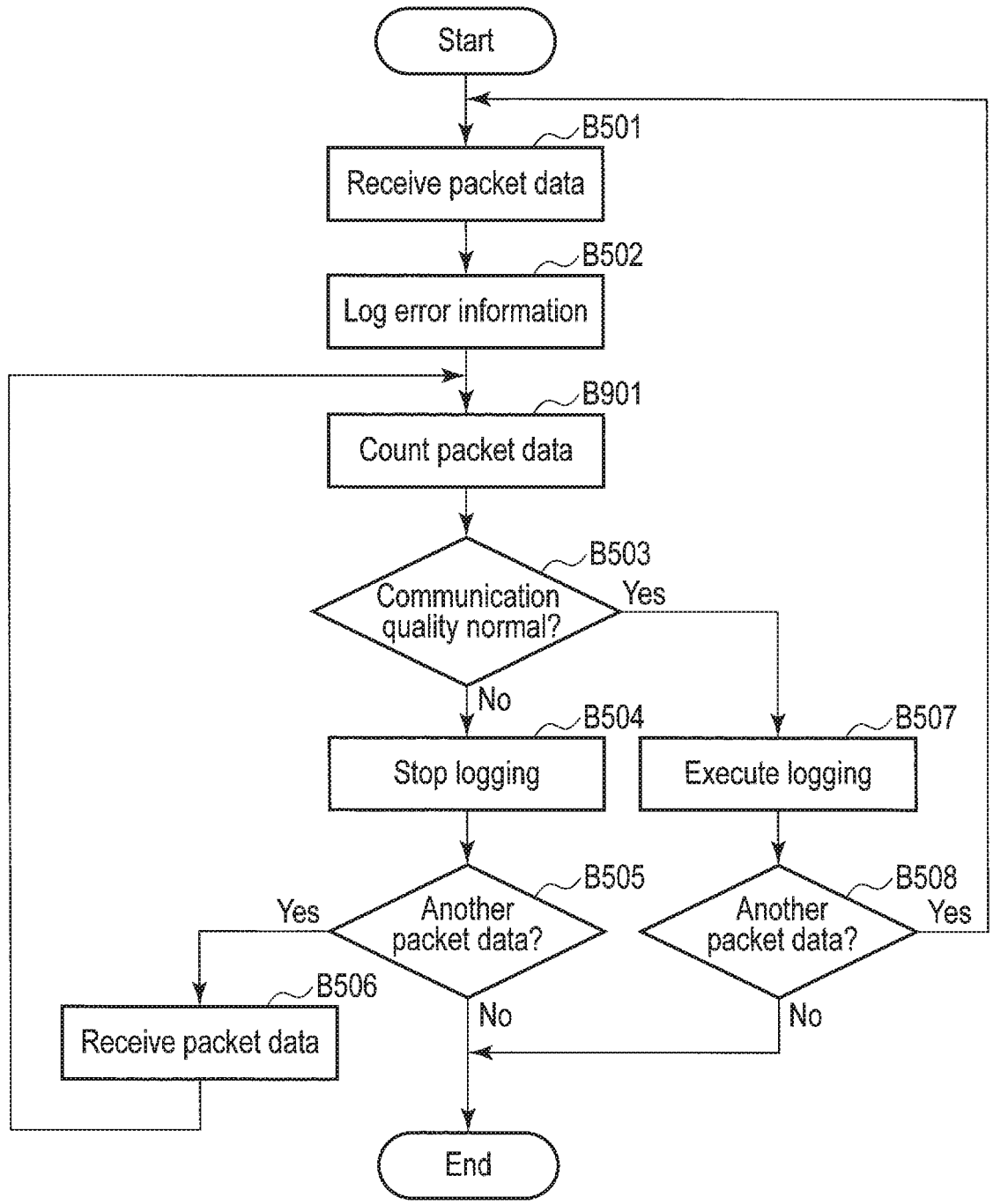
FIG. 9 is a flowchart showing an example of a serial communication method according to the second embodiment.

FIG. 9 is a flowchart showing an example of a serial communication method according to the second embodiment.

The system controller 130 receives given packet data PD from the host 100 (B501) and logs the error information of this packet data PD to the logging area LA (B502). The system controller 130 counts the packet data PD (B901). For example, the system controller 130 counts the number of consecutive invalid data and the number of consecutive valid data.

The system controller 130 determines whether the communication quality of the packet data PD is normal or not (B503). For example, in a case where the system controller 130 executes logging of the error information of the packet data PD to the logging area LA, the system controller 130 determines whether the number of consecutive invalid data is greater than or equal to the consecutive invalid data threshold or less than the consecutive invalid data threshold. For example, in a case where the system controller 130 stops loggings of the error information of the packet data PD to the logging area LA, the system controller 130 determines whether the number of consecutive valid data is greater than or equal to the consecutive valid data threshold or less than the consecutive valid data threshold.

When the system controller 130 determines that the communication quality of the packet data PD is not normal (NO in B503), the system controller 130 stops logging of the error information of the packet data PD transferred after the given packet data PD to the logging area LA (B504), and proceeds to the processing of B505. For example, when the system controller 130 executes logging of the error information of the packet data PD to the logging area LA, and if the system controller 130 determines that the number of consecutive invalid data is greater than or equal to the consecutive invalid data threshold, and determines that the communication quality is not normal, the system controller 130 stops logging of the error information of the packet data PD transferred after the last invalid data PD to the logging area LA, and proceeds to the processing of B505. For example, when the system controller 130 executes logging of the error information of the packet data PD to the logging area LA, and if the system controller 130 determines that the number of consecutive invalid data is greater than or equal to the consecutive invalid data threshold, and determines that the communication quality is not normal, the system controller 130 stops logging of the error information of the last invalid data PD to the logging area LA, and proceeds to the processing of B505. For example, when the system controller 130 stops logging of the error information of the packet data PD to the logging area LA, and if the system controller 130 determines that the number of consecutive valid data is less than the consecutive valid data threshold, and determines that the communication quality is not normal, the system controller 130 stops logging of the error information of the packet data PD transferred after the last valid data PD to the logging area LA, and proceeds to the processing of B505. For example, when the system controller 130 stops logging of the error information of the packet data PD to the logging area LA, and if the system controller 130 determines that the number of consecutive valid data is less than the consecutive valid data threshold, and determines that the communication quality is not normal, the system controller 130 stops logging of the error information of the last valid data PD to the logging area LA, and proceeds to the processing of B505.

When the system controller 130 determines that the communication quality of the packet data PD is normal (YES in B503), the system controller 130 executes logging of the error information of the packet data PD transferred after the given packet data PD to the logging area LA (B507), and proceeds to the processing of B508. For example, when the system controller 130 executes logging of the error information of the packet data PD to the logging area LA, and if the system controller 130 determines that the number of consecutive invalid data is less than the consecutive invalid data threshold, and determines that the communication quality of the packet data PD is normal, the system controller 130 executes logging of the error information of the packet data PD transferred after the last invalid data PD to the logging area LA, and proceeds to the processing of B508. For example, when the system controller 130 executes logging of the error information of the packet data PD to the logging area LA, and if the system controller 130 determines that the number of consecutive invalid data is less than the consecutive invalid data threshold, and determines that the communication quality of the packet data PD is normal, the system controller 130 executes logging of the error information of the last invalid data PD to the logging area LA, and proceeds to the processing of B508. For example, when the system controller 130 stops logging of the error information of the packet data PD to the logging area LA, and if the system controller 130 determines that the number of consecutive valid data is greater than or equal to the consecutive valid data threshold, and determines that the communication quality is normal, the system controller 130 executes logging of the error information of the packet data PD transferred after the last valid data PD to the logging area LA, and proceeds to the processing of B508. For example, when the system controller 130 stops logging of the error information of the packet data PD to the logging area LA, and if the system controller 130 determines that the number of consecutive valid data is greater than or equal to the consecutive valid data threshold, and determines that the communication quality is normal, the system controller 130 executes logging of the error information of the last valid data PD to the logging area LA, and proceeds to the processing of B508.

According to the second embodiment, the electronic communication device (for example, the magnetic disk device) 1 determines whether the communication quality of the packet data PD is normal or not based on the number of packets of consecutive packet data transferred consecutively from the electronic communication device 100. When the electronic communication device 1 determines that the communication quality of the packet data PD is not normal based on the number of packets of consecutive packet data PD, the electronic communication device 1 stops logging of the error information of the packet data PD to the logging area LA. For example, when the electronic communication device 1 determines that the number of consecutive invalid data is greater than or equal to the consecutive invalid data threshold, the electronic communication device 1 determines that the communication quality of the packet data PD is not normal, and stops logging of the error information of the packet data PD to the logging area LA. As described above, by stopping logging to the logging area LA when determining that the communication quality of the packet data PD is not normal based on the number of packets of consecutive packet data PD, the electronic communication device 1 can suppress logging of the error information of a plurality of invalid packet data PD which are caused by a misalignment of the boundary of packet data PD, etc., to the logging area LA. Therefore, the electronic communication device 1 can improve communication performance.

An example of an electronic communication device, a magnetic disk device and a serial communication device obtained from the configurations disclosed in the present specification will be additionally described.

(Aspect 1) An electronic communication device comprising a controller which controls, according to the number of bit data in which an error has occurred of packet data transferred in serial communication, whether to start logging of information about the error of the packet data or stop logging of information about the error of the packet data.

(Aspect 2) The electronic communication device of (Aspect 1), wherein when the number of bit data in which an error has occurred of first packet data is greater than or equal to a threshold, the controller stops logging from first information about of an error of second packet data of the packet data transferred after the first packet data.

(Aspect 3) The electronic communication device of (Aspect 2), wherein when the number of bit data in which an error has occurred of third packet data transferred after the second packet data is less than the threshold, the controller starts logging of second information about an error of fourth packet transferred after the third packet data.

(Aspect 4) The electronic communication device of (Aspect 1), wherein when the number of bit data in which an error has occurred of first packet data is greater than or equal to a threshold, the controller stops logging of first information about the error of the first packet data.

(Aspect 5) The electronic communication device of (Aspect 4), wherein when the number of bit data in which an error has occurred of second packet data transferred after the first packet data is less than the threshold, the controller starts logging of second information about the error of the second packet data.

(Aspect 6) The electronic communication device of any one of (Aspect 1) to (Aspect 5), wherein the threshold corresponds to the number of bit data which can be corrected by an error correction code.

(Aspect 7) The electronic communication device of (Aspect 1), wherein when the number of times invalid packet data which cannot be corrected by error correction is transferred consecutively is greater than or equal to a first threshold, the controller stops logging from first information about an error of first packet data transferred after first invalid packet data which is last invalid packet data of the consecutive invalid packet data.

(Aspect 8) The electronic communication device of (Aspect 7), wherein when the number of times valid packet data which can be corrected by error correction is transmitted consecutively after the first invalid packet data is greater than or equal to a second threshold, the controller starts logging from second information of an error of second packet data transmitted after first valid packet data which is last valid packet data of the consecutive valid packet data.

(Aspect 9) A magnetic disk device comprising: a disk; a head which writes data to the disk and reads data from the disk; and a controller which controls, according to the number of bit data in which an error has occurred of packet data transferred in serial communication, whether to start logging of information of the error of the packet data or stop logging of information of the error of the packet data.

(Aspect 10) A magnetic disk device comprising: a disk; a head which writes data to the disk and reads data from the disk; a memory; and a controller which controls, according to the number of bit data in which an error has occurred of packet data transferred in serial communication, whether to execute logging of information of the error of the packet data to the memory or stop logging of information of the error of the packet data to the memory.

(Aspect 11) A serial communication method applied to an electronic communication device, the serial communication method comprising controlling, according to the number of bit data in which an error has occurred of packet data transferred in serial communication, whether to start logging of information of the error of the packet data or stop logging of information of the error of the packet data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head which writes data to the disk and reads data from the disk;
   a memory; and
   a controller which controls, according to a number of bit data in which an error has occurred of packet data transferred in serial communication, whether to execute logging of information of the error of the packet data to the memory or stop logging of information of the error of the packet data to the memory,
   wherein
   when the number of times invalid packet data which are not correctable by error correction is transferred consecutively is greater than or equal to a first threshold, the controller stops logging from first information about an error of first packet data transferred after first invalid packet data which is last invalid packet data of the consecutive invalid packet data to the memory, and
   when the number of times valid packet data which are correctable by error correction is transmitted consecutively after the first invalid packet data is greater than or equal to a second threshold, the controller starts logging from second information of an error of second packet data transmitted after first valid packet data which is last valid packet data of the consecutive valid packet data to the memory.

* * * * *